(12) United States Patent
Vanpoulle et al.

(10) Patent No.: US 6,741,780 B2
(45) Date of Patent: May 25, 2004

(54) COATING FOR OPTICAL FIBERS AND METHOD OF MANUFACTURING THEREOF

(75) Inventors: Sophie Vanpoulle, Gif sur Yvette (FR); Stanislas Galaj, Arcueil (FR); Xavier Andrieu, Bretigny sur Orge (FR)

(73) Assignee: Alcatel, Paris (FR)

(*) Notice: Subject to any disclaimer, the term of this patent is extended or adjusted under 35 U.S.C. 154(b) by 226 days.

(21) Appl. No.: 09/985,859

(22) Filed: Nov. 6, 2001

(65) Prior Publication Data

US 2002/0054744 A1 May 9, 2002

(30) Foreign Application Priority Data

Nov. 7, 2000 (EP) .............................................. 00403080

(51) Int. Cl.$^7$ .............................. C08J 7/04; G02B 6/02; G02B 6/18
(52) U.S. Cl. ..................... 385/124; 127/128; 127/144; 127/145; 428/378; 427/501; 427/513
(58) Field of Search ................................. 427/501, 513; 385/124, 127, 128, 144, 145, 123; 428/378

(56) References Cited

U.S. PATENT DOCUMENTS

| 4,971,424 | A | * | 11/1990 | Babirad et al. | 385/145 |
| 5,054,872 | A | * | 10/1991 | Fan et al. | 385/130 |
| 5,253,323 | A | * | 10/1993 | Koike et al. | 385/143 |
| 5,425,122 | A | * | 6/1995 | Matsumura et al. | 385/124 |
| 5,541,247 | A | * | 7/1996 | Koike | 524/285 |
| 5,729,645 | A | * | 3/1998 | Garito et al. | 385/127 |

* cited by examiner

*Primary Examiner*—Susan Berman
(74) *Attorney, Agent, or Firm*—Sughrue Mion, PLLC

(57) ABSTRACT

Coating for an optical fiber and method of manufacturing thereof, the coating comprising at least one partly crosslinked polymer having a level of crosslinking which increases according to a radial distance as one moves from the internal surface (3) of the coating (4) which interfaces with a cladding section (2) to the external surface of the coating (4). The coating comprises a single resin which is composed of a volatile, multifunctional and moderately reactive monomer dissolved in a fast curable oligomer, having a low modulus when polymerized.

8 Claims, 1 Drawing Sheet

COATING FOR OPTICAL FIBERS AND METHOD OF MANUFACTURING THEREOF

FIELD OF THE INVENTION

The present invention relates to a coating for optical fibers and a method of manufacturing thereof. More particularly the invention proposes a coating for optical fibers having graded properties so as to improve its resistance under mechanical constraints.

BACKGROUND OF THE INVENTION

When optical fibers are subjected to mechanical constraints, their optical properties can decrease substantially. One of the main roles of a coating is that of protecting the fibers from such external perturbations. Thus the problem of obtaining a coating structure which could provide such protection in an efficient manner has existed in the related art.

A known solution is a single homogeneous layer for said coating. However as it is known, such single layer coating is not capable of providing an optimum resistance under a relatively high mechanical constraint. Due to theses drawbacks, single layer coating was replaced by a double coating technique using two different UV (ultraviolet) curing resins for coating, so as to provide a higher protection rate. In such structure, an internal layer having a glass transition temperature (Tg) of no more than about −20° C. and preferably about −30° C. or even lower, and a Young's modulus lower than 2 MPa, preferably 1 MPa or even lower, prevents microbending and an external layer with a relatively high Tg, generally approximately 50° C. and a modulus of about one hundred times higher provides good resistance for fibers handling and cables manufacturing process and installation.

Although the double layer structures have provided improvements in the mechanical properties of the fiber optic coatings, they still present the certain drawback due to the fact that in order to obtain the appropriate mechanical properties the thickness of the overall coating is increased which is not a desirable consequence. Another drawback of such structure is that the associated costs for manufacture of the double layer coating become substantially high.

It is therefore desired to obtain a coating structure such that while the mechanical properties are appropriate so as to resist mechanical constraints, the overall thickness of the coating as well as its manufacturing costs are maintained at relatively low levels.

DESCRIPTION OF THE INVENTION

In order to overcome the above drawbacks, the coating for optical fibers and the method of manufacturing thereof, objects of the present invention are proposed. A typical optical fiber structure has a central core section which is the optical fiber itself, covered by a cladding section for example of silica.

The coating as such covers the cladding section surrounding the outer surface of the latter. The coating proposed by the invention is of a so called graded modulus profile, meaning that the coating is configured so as to present a graded mechanical property as one moves outward from the interface between the cladding section and the coating material toward the outer (external) surface of the coating. The graded properties may thus be obtained by different procedure as will be explained in more detail further below.

Accordingly one objet of the present invention is that of providing a coating for an optical fiber, comprising at least one partly crosslinked polymer, characterized in that the level of crosslinking increases according to the radial distance from an internal surface of the coating which interfaces with a cladding section of the fiber to the external surface of the coating.

According to an aspect of the present inventions there is provided the coating comprises a single resin characterized in that said resin is composed of a volatile, multifunctional and moderately reactive monomer dissolved in a fast curable oligomer, having a low modulus when polymerized.

A further object of the present invention is that of providing a method of manufacturing of a coated optical fiber comprising the steps of drawing of the fiber, deposition of the coating, cure of the coating and spooling of the optical fiber, characterized in that the coating comprises a single resin composed of a volatile, multifunctional and moderately reactive monomer dissolved in a fast curable oligomer, having a low modulus when polymerized and in that said monomer is not completely cured.

According to an aspect of the present invention said volatile monomer is evaporated before without being completely cured.

According to another aspect of the present invention ultraviolet irradiation is used for an incomplete curing of the single resin.

According to yet another aspect of the present invention electron beam irradiation is used for an incomplete curing of the single resin.

These and other features of the invention are discussed in further detail in the following description as well as in the claims.

EXAMPLE OF A PREFERRED EMBODIMENT

Figure 1:
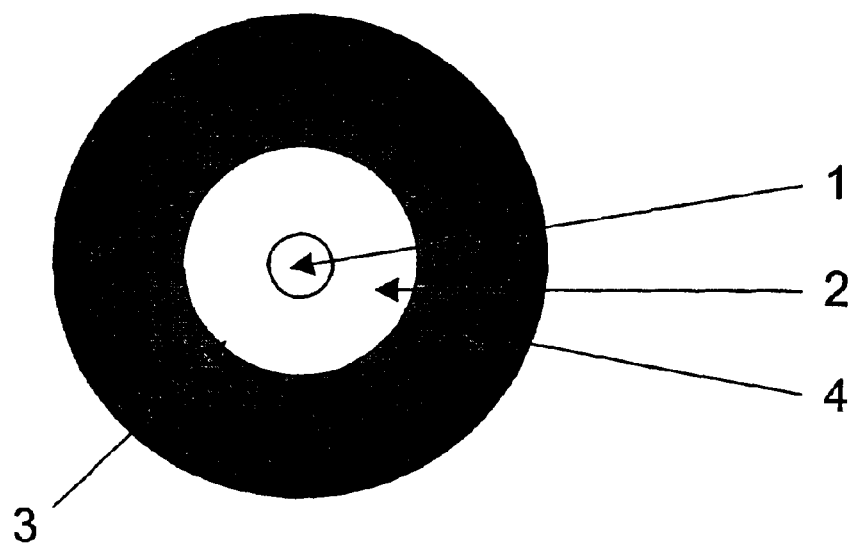
FIG. 1 is a schematic representation of a cross-section of an optical fiber according to the invention with the level of cross-linking being represented as a variably shaded part.

As represented schematically in FIG. 1, a typical optical fiber structure has a core 1 which is located in the central part of the fiber structure and constitutes the optical fiber itself. Said central core section 1 is covered by a cladding section 2 which surrounds the surface of the core section completely as seen in the figure. The material used for such cladding section may be for example of silica. The coating 4 as such covers the cladding section 2 and in turn surrounds the outer surface of the latter completely. In such as arrangement, the internal surface 3 of the coating 4 interfaces the outer surface of the cladding. The coating 4 proposed by the invention is of a so called graded modulus profile, meaning that the coating 4 is configured so as to present a graded mechanical property as one moves outward from the interface 3 between the cladding section and the coating material toward the outer (external) surface of the coating 4. For the sake of illustration and better understanding of the object of the invention, such graded properties have been represented in FIG. 1 by a shaded area within the coating 4. The level of the darkness in the shaded area in the figure represents the of graded properties. Thus as it may be observed in the figure, the shaded intensity is increased, meaning increase in the level of cross-linking of the coating 4.

Therefore, according to the structure shown in FIG. 1, the graded modulus profile coating proposed by the invention is made in a graded configuration such that the mechanical properties of the coating 4 is gradually increased against external perturbation as one moves from the internal surface 3 of the coating 4 which interfaces with the cladding section 2 of the fiber, towards the external surface of the coating 4.

Preferably, the procedures proposed by the present invention for obtaining graded properties in the coating may comprise the following:

A homogeneous polymer may be exposed under an electron beam (EB) irradiation. As a result of such irradiation, the polymer is converted into a graded crosslinked matrix. This procedure would be convenient as long as the fiber core itself is not damaged, which in certain occasions may not be the case.

A second, and more advantageous procedure, which is proposed as a preferred embodiment of the present invention, is that of using UV (Ultraviolet) irradiation, which while provide the same results, does not cause any significant damage to the fiber core. Therefore, with a single resin as material for the coating layer, graded properties may be obtained by incomplete UV curing followed by inactivation or elimination of the residual reactive functions.

For example, a resin may be selected having a volatile, multifunctional and moderately reactive monomer, where volatile is understood to mean having a non zero partial vapor pressure at room temperature; the volatile monomer has a partial vapor pressure sufficiently high to be evaporated under vacuum (preferably between $10^{-6}$ atm and 0.1 atm) at room temperature. The resin is dissolved in a fast curable oligomer, and having a low modulus when polymerized.

Next, the resulting polymer is deposited on a drawn optical fiber and put under a controlled curing process under an UV flux. The UV dose is lower than the dose which is required to fully cure the material. This procedure provides the so-called incomplete W curing. As a result the polymer obtains graded mechanical properties with sufficient hardness so as to be wound on a spool without deformation. The excess of the unreacted monomer is then evaporated in a vacuum chamber. It is to be noted that during the curing process, the matrix itself is homogeneously cured, however the volatile monomer is gradually cured, thus the evaporation of the monomer eliminates the part which is still uncured. This procedure gives rise to the fact that the level of cross linking increases gradually from the claddingcoating interface, i.e. the internal surface of the coating, toward the external surface of the same.

The following formulation information is provided as an exemplary manner and should not be construed as to limit the scope of the present invention, but only for the purpose of providing a better understanding of the same.

64% primary resin such as DeSolite® 3471-1-135;
32% reactive diluent, for example SR 206 from Sartomer (ethylene glycol dimethacrylate);
1% antioxidant, for example Ionol;
3% photoinitiator, for example Irgacure® 184 from Ciba;
The glass transition temperature is less than −40° C.

Using the above formulation, thin films about 50 μm may be cured in a variable speed UV conveyor and the excess reactive monomer is then evaporated under vacuum at room temperature. The resulting film provides mechanical properties which may be determined under compression tests, and which are different on the two surfaces of the film.

In this manner, a coating is obtained which while provides at least the same mechanical properties as the known double layer coatings, can present a thickness which can be lower, or at least the same as that of standard double layer coatings, but with improved mechanical properties compared to standard double layer coatings.

Further advantages of the present invention are that the cost of manufacture of the overall coated fiber is reduced due to a lower resin consumption, and the drawing speed of the fiber is increased under the same UV flux which is made possible because of the lower thickness of the resin.

It is to be noted that in the case of using EB irradiation, the procedure is substantially the same as that for UV irradiation, save for the use of EB instead of UV irradiation.

What is claimed is:

1. A coated optical fiber, comprising:
    a central portion having a cladding section; and
    a coating over said central portion, wherein said coating comprises at least one partly crosslinked resin, wherein a level of crosslinking of said resin increases according to a radial distance from an internal surface of the coating which interfaces with said cladding section to an external surface of the coating.

2. The optical fiber of claim 1, wherein said resin is composed of a volatile, multifunctional and moderately reactive monomer dissolved in a fast curable oligomer, and wherein said resin has a low modulus when polymerized.

3. A method of manufacturing of a coated optical fiber comprising:
    drawing an optical spacing fiber,
    depositing a coating on said optical fiber,
    curing the coating, and
    spooling the coated optical fiber,
    wherein the coating comprises a resin composed of a volatile, multifunctional and moderately reactive monomer dissolved in a fast curable oligomer, and wherein said resin has a low modulus when polymerized and said monomer is not completely cured.

4. The method of claim 3, wherein at least some of said volatile monomer is evaporated without being completely cured.

5. The method of claim 3, wherein ultraviolet irradiation is used for the incomplete curing of the resin.

6. The method of claim 3, wherein electron beam irradiation is used for the incomplete curing of the resin.

7. The method of claim 4, wherein ultraviolet irradiation is used for the incomplete curing of the resin.

8. The method of claim 4, wherein electron beam irradiation is used for the incomplete curing of the resin.

* * * * *